United States Patent [19]

Reinhardt

[11] Patent Number: 4,500,766

[45] Date of Patent: Feb. 19, 1985

[54] METHOD OF FUSION OF INSERTS TO SNOW PLOW RUNNERS

[75] Inventor: Paige J. Reinhardt, St. Paul, Minn.

[73] Assignee: Paper, Calmenson & Co., St. Paul, Minn.

[21] Appl. No.: 345,725

[22] Filed: Feb. 4, 1982

[51] Int. Cl.³ .............................................. B23K 9/04
[52] U.S. Cl. .............................. 219/76.1; 219/137 R; 280/28
[58] Field of Search ............ 219/98, 99, 137 R, 76.14, 219/76.17, 76.1; 280/28

[56] References Cited

U.S. PATENT DOCUMENTS 2,202,309  5/1940  Campbell .............................. 280/28
2,593,025  4/1952  Hanson et al. ........................ 280/28
4,403,639  9/1983  Holte .................................... 219/99

Primary Examiner—Clifford C. Shaw
Attorney, Agent, or Firm—Jacobson & Johnson

[57] ABSTRACT

A snow plow runner for supporting the blade of a snow plow above the abrasive surface of a roadway with the snow plow runner formed of a material of a first melting temperature and having a plurality of hardened pads formed of a material of a similar melting temperature to permit fusing the pads to the snow plow runner to provide a high abrasion resistant surface that permits the snow plow runners to be used over an extended period of time.

3 Claims, 3 Drawing Figures

METHOD OF FUSION OF INSERTS TO SNOW PLOW RUNNERS

DESCRIPTION OF THE PRIOR ART

The concept of snow plow runners to hold the snow plow blades a predetermined distance from the roadway is old in the art. Typically, the snow plow runners are wear plates comprised of a high abrasion resistant steel or iron. The purpose of the wear plates is to make contact with the abrading surface of the roadway and hold the snow plow blade off the roadway as the snow plow blade passes over the roadway. The roadway may be gravel, asphalt or concrete. Since the road surfaces are quite abrasive to provide tire traction the runners wear relatively rapidly. To prevent undue wear on the blade one uses runners which are smaller than the blades and cheaper to replace than the blades. The runners are allowed to take the wear that the blades would encounter but offer the advantage of being cheaper to replace than the blade. Since much of the runner is not in contact with the roadway, the runners are generally made of a metal which is not too costly yet has a certain degree of hardness to prevent rapid wear. Typically, the runners are made of cast iron, cast steel or rolled steel, usually with a Rockwell C hardness of 25 or less. The use of cast iron, cast steel or rolled steel permits one to manufacture relatively inexpensive runners which can be replaced at low cost yet have wear life longer than softer metals. To lengthen the life of the snow plow runners, efforts have been made to fasten tabs of higher abrasion resistant material to the bottom of the shoes; however, efforts to do so have generally proven unsatisfactory since the harder tabs generally fall out during use. Generally, the cost of placing the tabs on the shoes was not cost effective since the tabs tended to fall out during use and making the entire runner of the harder material was not practical nor cost effective. That is, it turned out to be cheaper to repeatedly replace conventional runners than attempt to put hardened tabs on a runner to obtain longer runner life or to make the entire runner of the harder material.

This invention comprises the discovery of a method of making a runner and a runner which provides a wear life of up to one and one-half times the length of prior art runners as well as eliminating the problem of runner and insert separation occurring during use. Thus, the snow plow runners of the present invention allow one to produce snow plow runners with a longer life but also with a cost effectiveness that makes it practical to use in place of conventional steel runners or shoes.

BRIEF SUMMARY OF THE INVENTION

Briefly, the invention comprises a snow plow runner having a plurality of titanium carbide inserts embedded in the runner to provide a high resistant wear surface in the hardened surface of the snow plow runner with the inserts characterized by having a melting range on the order of the melting range of the snow plow runner.

DESCRIPTION OF THE PREFERRED EMBODIMENT

Figure 1:
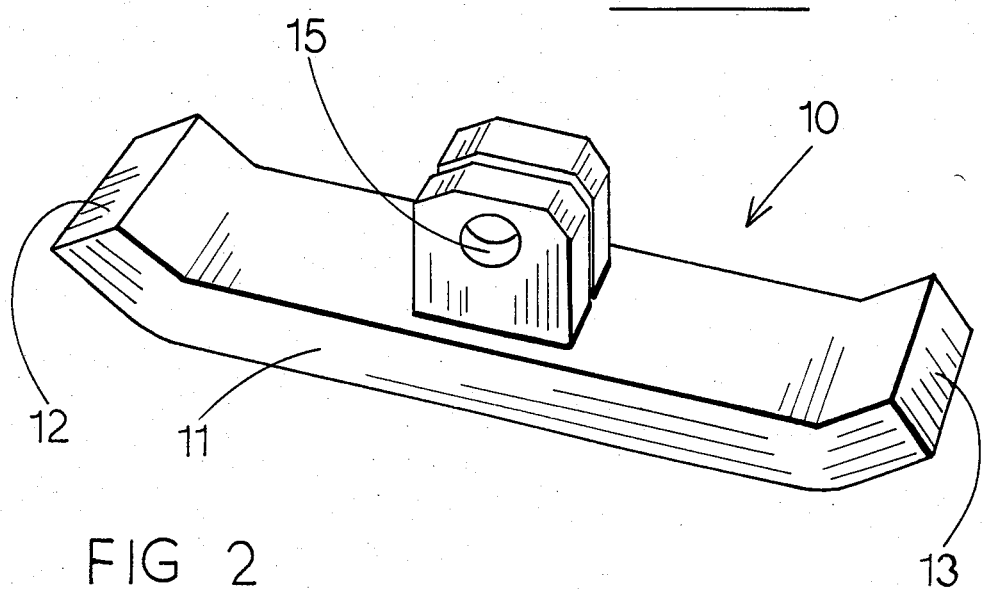
FIG. 1 is a top view of the snow plow runner.
Figure 2:
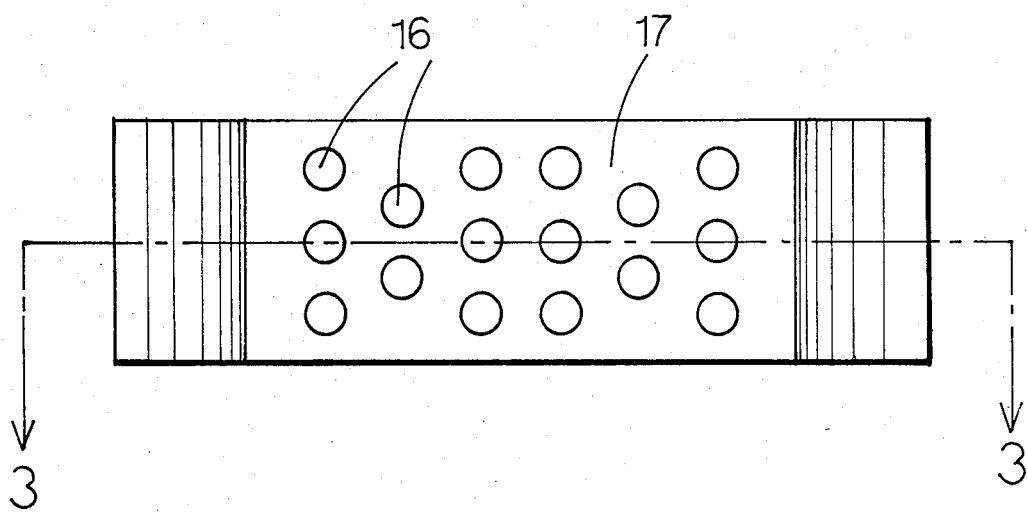
FIG. 2 is a bottom view of the snow plow runner.
Figure 3:
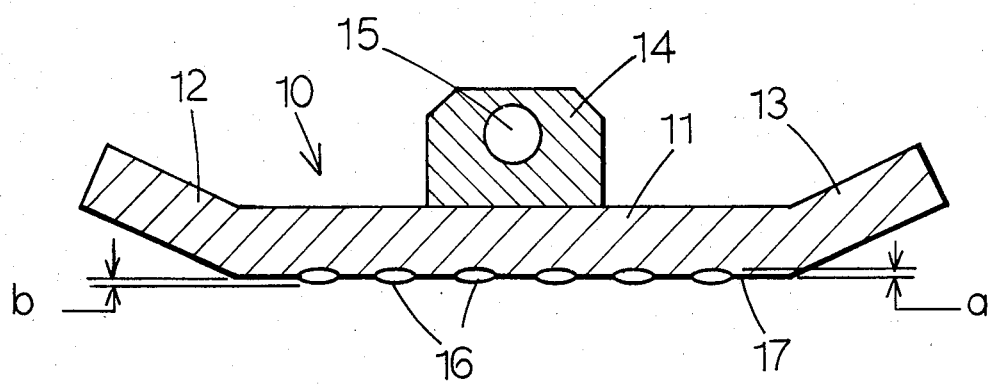
FIG. 3 is a sectional view of the snow plow runner taken along lines 3—3 of FIG. 2.

Referring to the drawing, reference numeral 10 generally designates a snow plow runner having a flat base section 11 and up-turned ends 12 or 13 and a hold 15 for mounting shoe 10 to a snow plow. Located on the underside 17 of runner 10 are a plurality of pads of high abrasion resistant material 16. FIG. 3 more fully shows the high abrasion resistant pads 16 which are embedded in the shoe a distance denoted by a and projected outward from the shoe distance denoted by b. Briefly, the snow plow runner 10 is preferably made of steel, cast iron, cast steel or any of the good wearable steels which may be heat treated. Preferably, the hardness of the steel runner is on the order of Rockwell C of about 25. While use of a runner of less hardness would be useable, one would eliminate the coactive effect one obtains by improving on the present runner. A specific metal which works well for runners is AISI C1074. The inserts which are made from much harder material are commercially available in strip or rod form. A typical hardened insert is comprised of carbon/chromium tool steel matrix of 17% alloy steel having 11% by volume of titanium. However, other hardened inserts would be useable as long as they were cost effective and could be integrally formed into the runner. The hardness of the titanium inserts is on the order of Rockwell C57-60. It is the harder inserts which provide the longer wear life but it is the integral combination of the harder insert with the snow plow runner that makes the invention cost effective. A typical shoe may vary in width from four to 10 inches and in length from six to 20 inches. On a typical shoe there is approximately 1,000 square inches of runner surfaces with inserts 16 comprising only approximately 15% of the shoe surface. Although other configurations could be used, the typical insert is a circular pad approximately one inch in diameter. The penetration dimension of the insert is shown as approximately $\frac{1}{8}$ of an inch as is the projecting dimension b. Surprisingly, the projection of the inserts does not result in the inserts being easily removed. It will also be noted that the hardened insert comprises only a small portion of the runner surface. The criteria for the present invention to work is that the hardened insert material has a melting range temperature on the same order as the shoe. It has been discovered that if the insert and the runner have about the same melting range temperature, one can fuse the hardened inserts to the runner through an electrical fusion process. In the above-described runner and insert the melting range of both insert and runner is about 2,800° F.

The electrical fusion process does not have any effect on the base material other than to melt the insert into the runner. The fusion process produces an actual melting of the two materials and results in a tenacious bond between the hardened insert 16 and runner 10 although the hardened insert pads 16 project laterally outward from the shoe as shown in FIG. 3. It has been found that with embedded insert 16 in runner 10 one can provide up to one and one-half times as long a life as the previous snow plow runners even though only as little as 15% of the wear surface of the snow plow runner has been covered with a hardened material. Although more or less pads could be embedded into the runner, it has been found that covering as little as 15% of the surfacce area provides probably the optimum cost effectiveness.

In the electrical fusion process the pads of hardened material 16 are placed on the wear surface 17 of shoe 11. The wear surface 17 of shoe 10 is flat and needs no recess or grooves for inserts 16. With the shoe size range and the insert size range described a seven second cycle of 400 amps at 24-30 volts can be applied to insert 16 and runner 11 to fuse the insert into the runner. The current from electrical fusion process simultaneously melts both shoe 10 and insert 16 at their interface to permit inserts 16 to integrally embed themselves into runner 10 as shown in FIG. 3.

I claim:

1. The method of making a wear runner comprising the steps of:

forming a runner having a wear resistant surface from a first material having a predetermined melting temperature and a predetermined hardness;

selecting an insert for applying to the runner with the insert characterized by having a greater hardness than the runner and a melting temperature on the same order as the runner; and embedding the insert into the runner approximately $\frac{1}{8}$ inch through melting of both the runner and the insert through electrical fusion of the insert to the runner so that the insert projects approximately $\frac{1}{8}$ inch from said runner.

2. The method of claim 1 wherein the melting temperature of the runner and the insert is about 2,800° F.

3. The method of claim 2 wherein a portion of the inserts are fused into the wear surface of the runner while leaving a portion of the insert projecting outward from the surface of the runner.

* * * * *